Feb. 26, 1957  J. G. LEE ET AL  2,782,593
MULTI-UNIT RAMJET

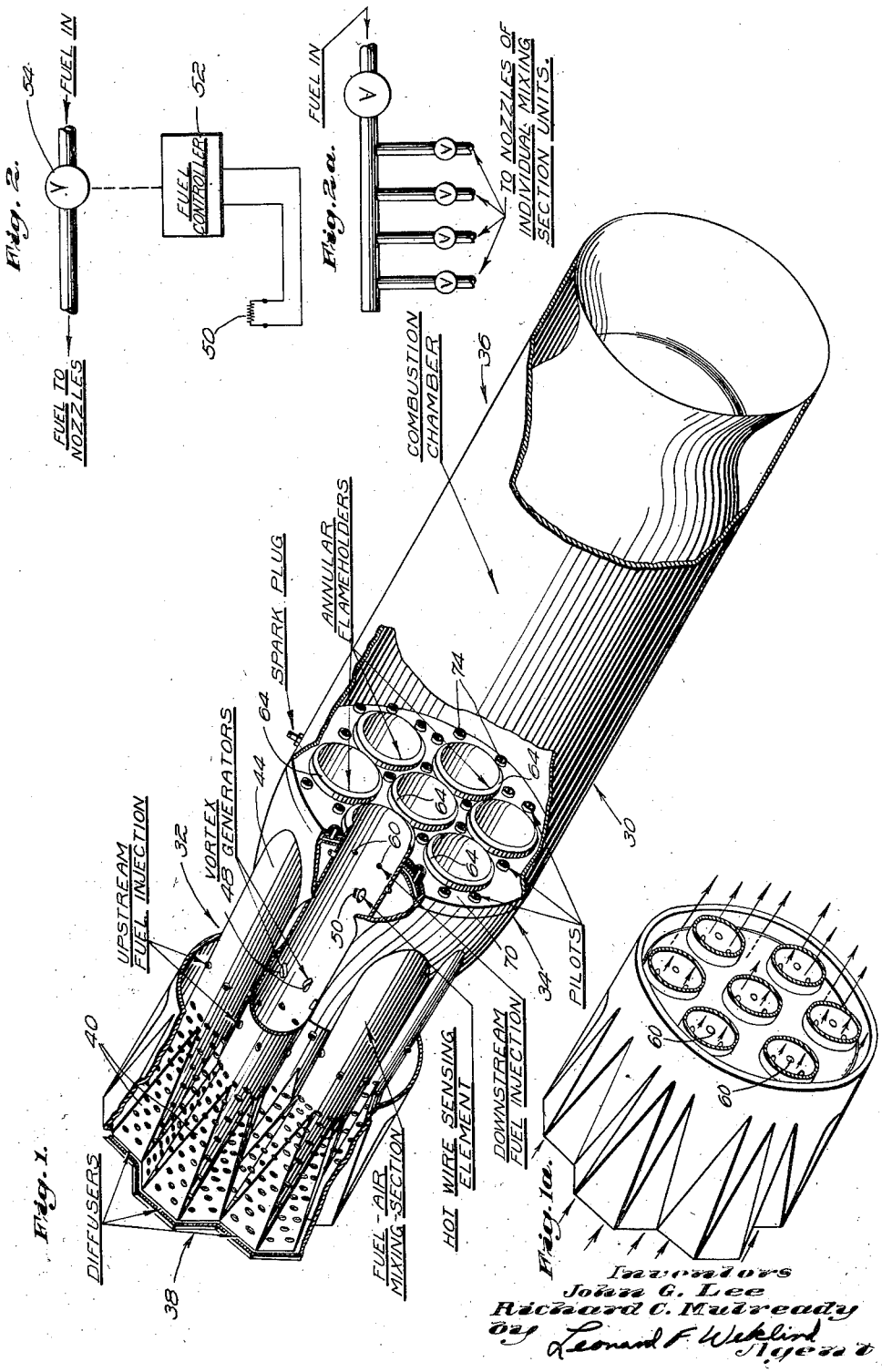

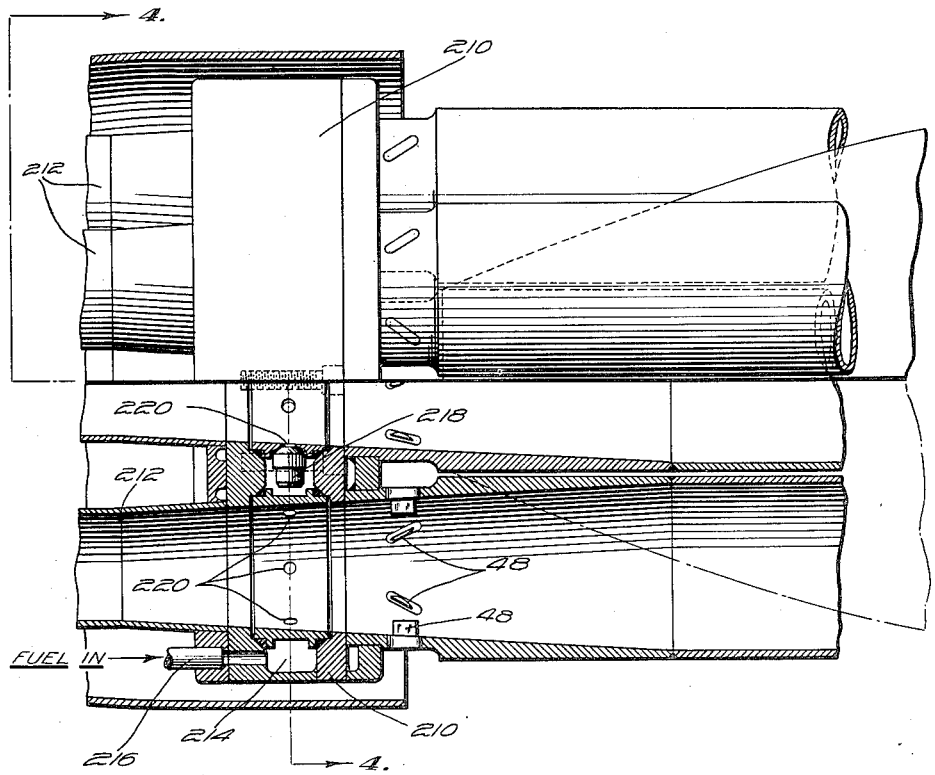

Filed June 8, 1951  6 Sheets-Sheet 3

Inventors
John G. Lee
Richard C. Mulready
by Leonard F. Wehlind
Agent

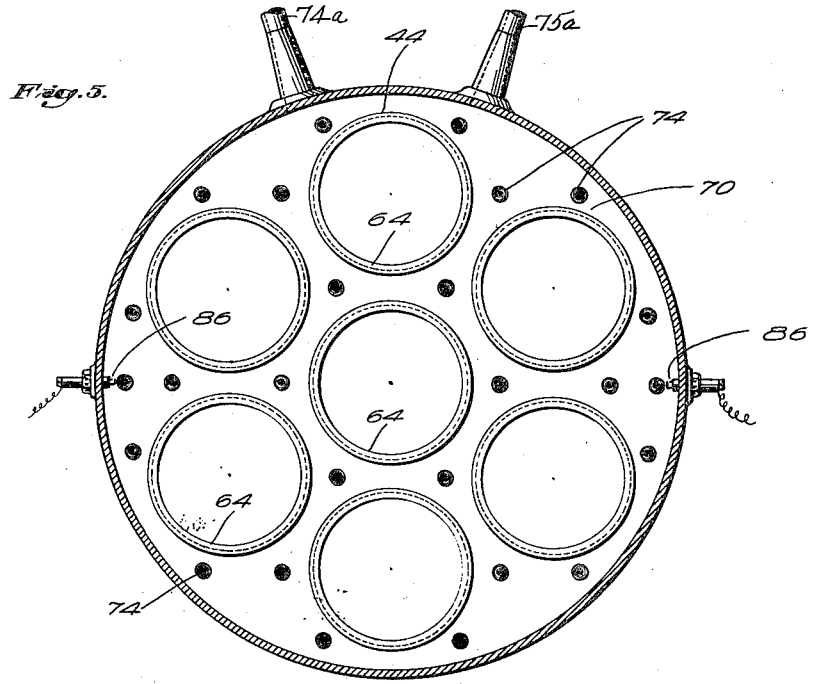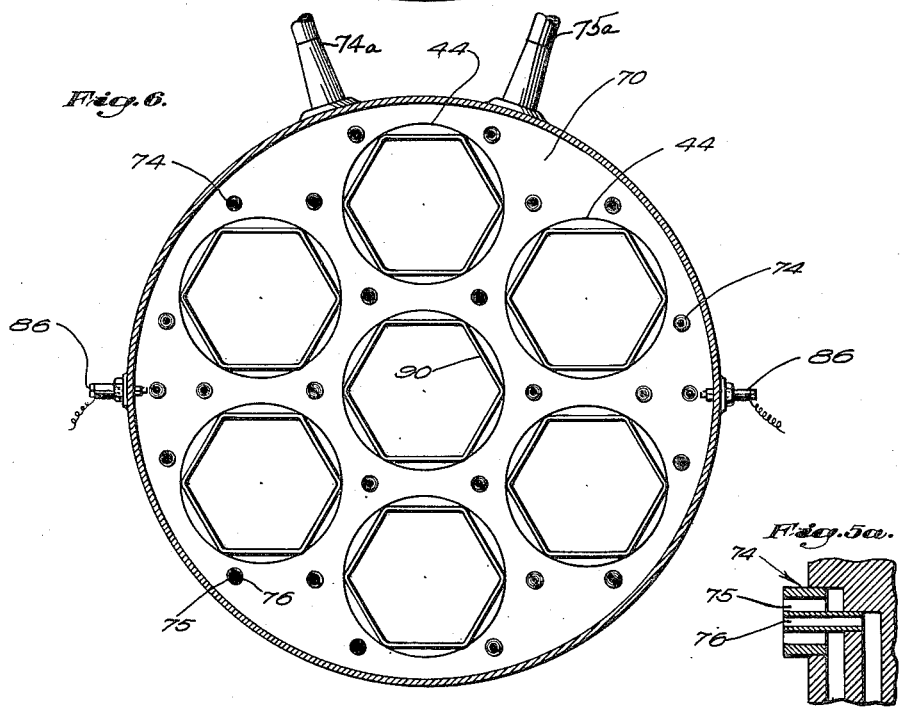

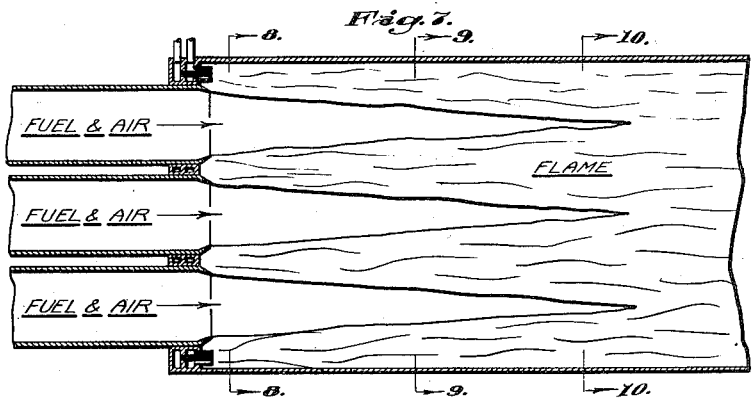
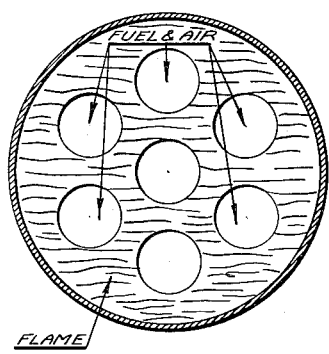
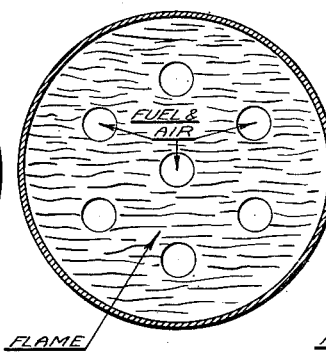
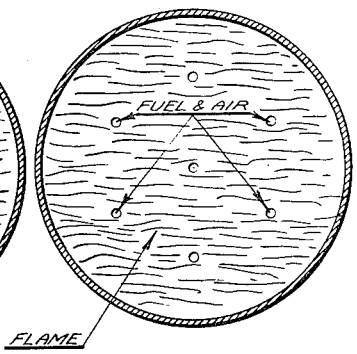
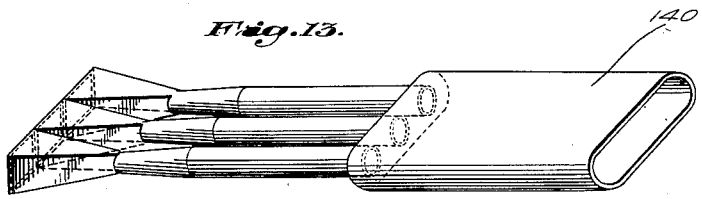
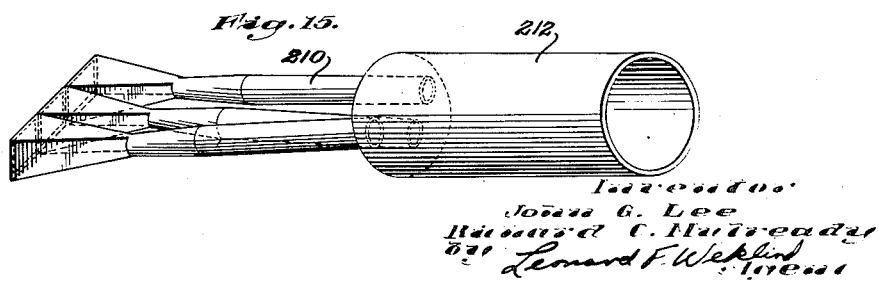

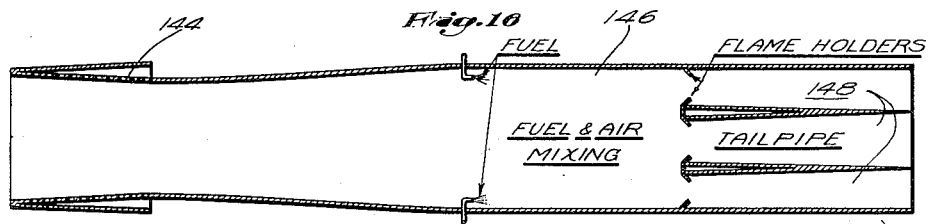
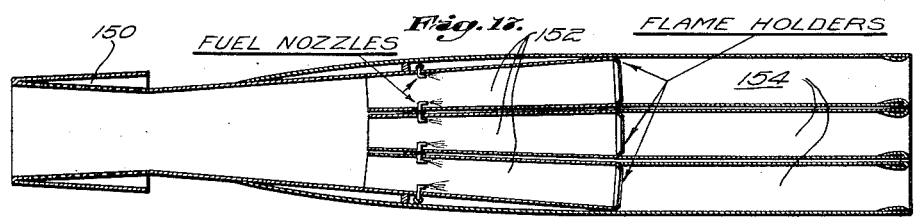
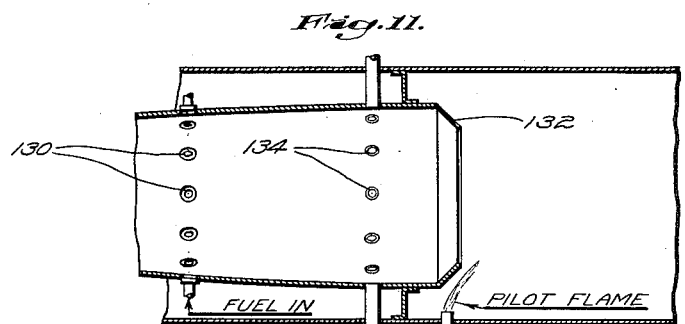
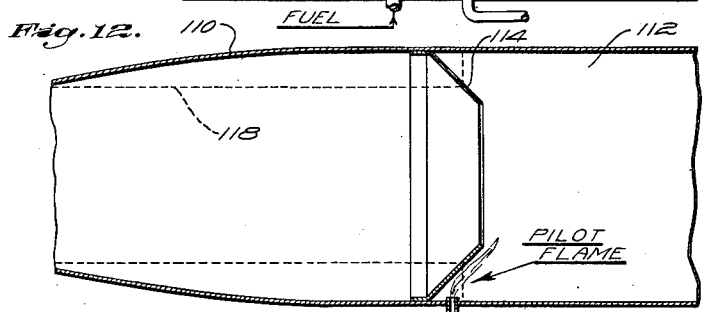

United States Patent Office 2,782,593
Patented Feb. 26, 1957

2,782,593

MULTI-UNIT RAMJET

John G. Lee, Farmington, and Richard C. Mulready, Glastonbury, Conn., assignors to United Aircraft Corporation, East Hartford, Conn., a corporation of Delaware Application June 8, 1951, Serial No. 230,564

15 Claims. (Cl. 60—35.6)

This invention relates to ramjet power plants and more specifically to multi-unit ramjet power plants.

It is an object of this invention to provide a ramjet power plant having at least one of its major sections comprising a plurality of individual units.

A further object of this invention is to provide a multi-unit ramjet power plant wherein the size of the power plant can be varied at will by varying the number of individual units forming any major component of the power plant.

Another object of this invention is to provide a multi-unit ramjet power plant having improved structural features which provide efficient combustion over a wide range of fuel-air ratios.

These and other objects will become readily apparent from the following detailed description of the drawings in which:

Fig. 1 is a perspective view of the ramjet of this invention with portions broken away for illustration of the interior thereof.

Fig. 1a is a perspective view of the cowl surrounding the supersonic diffuser section of Fig. 1.

Fig. 2 is a schematic illustration of the main fuel control.

Fig. 2a is a schematic illustration of a modified fuel system.

Fig. 3 is a detail partial cross section through the burner illustrating the nozzle connections and fuel manifold.

Fig. 5 is a detailed view of the flameholder wall looking at the downstream side thereof.

Fig. 5a is a detailed cross-sectional view of one of the pilots.

Fig. 6 is a modification of the Fig. 5 illustration.

Figs. 7, 8, 9 and 10 are illustrations of the flame pattern in the combustion chamber.

Figs. 11 and 12 illustrate the transition in construction from an ordinary flameholder to the "sudden expansion" construction of this invention.

Figs. 13 through 18 illustrate various modifications of this invention.

Figure 4:
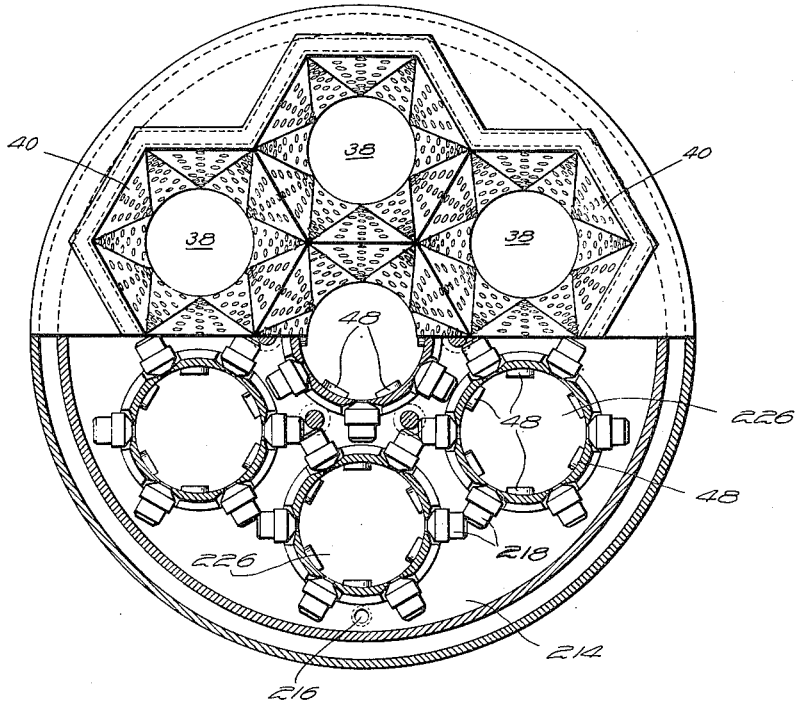
Fig. 4 is a semi-cross-sectional view with the sectioned portion being taken substantially along the line 4—4 of Fig. 3.

The requirement for ramjets of increased power output has made the testing of large units difficult during preliminary design stages. Also, it is not always economically feasible or often physically practicable to construct enlarged testing facilities for such engines of increased capacity. As a result, it is the purpose of this invention to provide a multi-unit power plant which readily lends itself to small scale testing on a unit basis while permitting a number of these proven units to be grouped together to provide power plants of varied capacities.

Referring to Fig. 1, a ramjet power plant is generally indicated at 30 and includes primarily a diffuser or mixing section 32, a flameholder section 34 and a combustion chamber 36. The diffuser or mixing section 32 includes a plurality of individual units which are grouped together in the form of a cluster. The diffuser section 32 then includes a plurality of individual inlets generally indicated at 38 at the upstream end of supersonic diffuser portions 40. The supersonic diffuser portions 40 each comprise a converging duct having perforations in the wall thereof to provide bleeds to insure swallowing of the shock waves down to the point approximately of the maximum convergence of the diffuser ducts. These bleeds may have a cross-sectional shape of the type described and claimed in copending patent application Serial No. 198,832, filed December 1, 1950, by George H. McLafferty. The bleed apertures of this last mentioned application are of fixed dimension but are sensitive to supersonic and subsonic flow to the extent that substantial bleeding takes place only during subsonic flow and little or no bleeding occurs once the shock is swallowed.

The supersonic diffuser portions 40 exhaust air therefrom into subsonic diffuser sections 44 which can be equally termed mixing sections. Each of the mixing sections 44 have upstream and downstream fuel injection means as illustrated, each comprising a plurality of peripherally spaced nozzles which are preferably flush with the wall of the diffuser duct. In order to improve the mixing of the fuel with the air passing through the mixing section ducts 44, a plurality of vanes 48 of airfoil shape are located at peripherally spaced intervals downstream of the upstream fuel injection nozzles. These vanes have their chordwise dimension set at an angle relative to the axis of flow so that a tip vortex is produced by each of the vanes. Each adjacent vane 48 has its chordwise dimension oppositely inclined so that a plurality of counterrotating vortices trail downstream therefrom. Downstream of the vanes 48 a hot wire sensing element 50 is provided in order to sense the weight rate of air flowing through the duct. Vortex generating vanes for mixing fuel and air are more specifically described and claimed in copending patent application Serial No. 788,566, filed November 28, 1947, by John G. Lee, now matured into Patent No. 2,607,191, issued August 19, 1952.

As schematically illustrated in Fig. 2, the sensing element 50 may be utilized to pass a signal to a fuel controller 52 which in turn can operate a fuel valve 54. As seen in Fig. 3, a fuel manifold 210 is shown which has each of the diffuser units 212 passing therethrough. Thus the manifold includes a hollow chamber 214 which fills the areas between each of the diffusers 212. Fuel under pressure is fed to the manifold by means of an inlet pipe 216 from where it is injected into each of the unit diffusers by nozzles 218 which have a fluid tight connection through the walls of the diffusers. The vortex generating vanes 48 are best seen in this figure. It will be noted that adjacent vanes are oppositely inclined relative to the axis of flow so as to produce the above-mentioned counterrotating vortices. In addition, the vanes 48 are so arranged that each nozzle 220, for example, is aligned with the space between the vanes relative to the axis of flow. It has been found that this arrangement produces the most efficient mixing between the fuel and the air.

As best seen in Fig. 4, the hollow chamber 214 of the fuel manifold communicates with each of the nozzles 218 which in turn injects fuel into each of the mixing chambers 226. The alignment of the nozzles 218 relative to the vortex generating vanes 48 is also clearly illustrated herein.

The downstream fuel injection nozzles 60 (Fig. 1) may be fed fuel through the same main fuel control which regulates fuel flow to the upstream fuel injection nozzles or a separate control may be provided. A separate fuel control for the downstream nozzles 60 may be desirable in order to vary the fuel-air ratio adjacent the downstream lips 64 of the mixing ducts 44. The lips 64 are constructed as inwardly directed flanges as will be illustrated and described hereinafter.

The flameholder section 34 includes a plate-like member or wall 70 which includes a plurality of openings to receive and support the downstream ends of the mixing ducts 44. The plate or wall 70 also includes a plurality of pilot nozzles 74 directed parallel to the axis of flow through the power plant. The pilots 74 preferably emit a fuel-air mixture or a gaseous fuel and a combustion supporting gas via coaxial tubes as shown in Fig. 5a. These gases may be fed to separate chambers via separate pipes 74a, 75a schematically shown in Figs. 5 and 6.

The arrangement of the axially directed pilots 74 is shown more clearly in Fig. 5. These pilots comprise two concentric tubes 75 and 76 which are fed with a fuel and a combustion supporting gas, respectively, as for example hydrogen and oxygen. Igniters such as spark plugs 86 may provide ignition for the pilots. As stated above, the pilots may be fed a fuel-air mixture which might readily be bled from the main mixing chamber and directed into the protected flame spreading area. It will be noted that all the pilots are in a shielded area which is not exposed to the main stream flowing past the lip 64 of the ducts 44. This shielded area is formed by the spaces between the openings in the plate 70. All of the pilots then cooperate to form an interconnected flame area for igniting the fuel-air mixture entering the combustion chamber.

With a pilot flame area of this type it has been found that the power plant can be operated at almost maximum efficiency even when a number of the units are not operating, i. e., the fuel can be shut off in a number of the mixing ducts 44 and efficient operation and combustion will still be maintained in the combustion chamber. As seen in Fig. 2a, additional valves may be provided so that the fuel to any number of individual diffuser-mixing units may be cut-off to operate the power plant at a substantially reduced power output. When increased thrust is required additional units may be cut in by opening the individual fuel valves either manually or by means of a regulating mechanism.

As illustrated in Fig. 6, it has been found that more efficient combustion can be maintained if the flameholding areas between the individual duct units 44 are substantially identical in dimensions. Hence, in forming the inwardly directed lips at the downstream end of the ducts 44, it is preferred that these lips be formed in the form of a polygon 90. It will then be apparent that the space or area between adjacent ducts 44 will be substantially identical in dimensions. With such a construction more uniform flame propagation is obtained downstream of the flameholder wall 70.

The flame propagation downstream of the flamespreading area is best illustrated in Figs. 7 through 10. It will be noted herein that due to the fact that each stream of fuel-air mixture is completely surrounded by a pilot flame, uniform flame propagation is obtained as the combustible mixture moves downstream in the combustion chamber.

In a power plant of this type having a plate-like wall and a flame-spreading area, as shown, the fuel-air mixture flowing into the combustion chamber is subjected to what can be termed a "sudden expansion." This can best be illustrated by referring to Figs. 11 and 12. Previously in a single unit burner, as shown in Fig. 12, the mixing or subsonic diffuser section 110 had diverging walls in a downstream direction and adjacent the upstream end of the combustion chamber 112 a flameholder was provided in the form of a frustro-conical shield 114 which was located in a constant cross-sectional portion of the duct. A pilot 116 is then provided on the downstream side of the shield 114 to create a surrounding flame in the low pressure turbulent area immediately downstream of the shield. Rather than having a diverging diffuser section and then having a constriction in the passage downstream thereof, as caused by the flamespreader shield 114, it has been found that the diffusing mixing section could be maintained substantially uniform in cross section as indicated by the dotted line 118. Then after passing over the lip of the flamespreader the fuel-air mixture would pass into an enlarged combustion chamber duct so as to suddenly expand this mixture. The resultant construction is then represented by Fig. 11 which in essence represents, in a single unit, the construction shown and described in connection with the multi-unit power plant.

The advantage gained by the "sudden expansion" construction can be described in somewhat different terms. In other words, the usual method is to locate a flameholder in a stream of substantially constant cross section. The flameholder may take the form of a grid, a series of cones, an annular shield or other devices, but they all have in common an arrangement which permits smooth flow over the upstream section of the flameholder with an eddy system in the wake. In each case, however, the stream is restricted by the flameholder to accelerate the stream and reduce its pressure. If the stream is not expanded (slowed down by diffusion) to a greater cross section than the restricted stream cross section at the flameholder, the flameholder cross-sectional area can be located substantially upstream so that a portion of the diffuser length is eliminated while still maintaining adequate pressure increase through the "sudden expansion" area adjacent the downstream face of the flameholder. The use of "sudden expansion" construction has particular utility in diffuser units of large diameter where the length of the diffuser is the controlling factor rather than the length required for obtaining adequate fuel-air mixing prior to combustion. Thus a saving in diffuser length may be obtained in larger diameter units so that the space saved by the non-diverging walls (Fig. 11) may be used for accessories or fuel.

The type of construction illustrated in Fig. 12 is more clearly described and claimed in copending patent application Serial No. 303,599, which has matured into Patent No. 2,744,384, issued May 8, 1956, which is a continuation of abandoned application Serial No. 118,296, filed September 28, 1949, by Robert H. Loughran.

While referring to Fig. 11, the theory behind the use of two sets of fuel nozzles (upstream and downstream) can best be illustrated. The normal range of operation under which sustained combustion can be maintained will be determined by the amount of fuel being injected via the upstream nozzles 130. The fuel from these nozzles 130 will be throughly distributed throughout the stream as it passes over the lip of the flamespreader 132. The fuel from the nozzles 134, however, will tend to flow adjacent the lip 132 since it does not have a chance to be distributed across the entire stream. The flow of fuel from the nozzles 134 is relatively much less than the flow from the nozzles 130; hence, the flow from the latter generally effects the overall fuel-air ratio. At relatively lean fuel-air ratios where combustion might readily be disrupted, the nozzles 134 will maintain a relatively rich mixture adjacent the lip 132 to maintain combustion and enhance further flame propagation downstream. In this manner the lean limit of operation can be greatly improved.

Figure 14:
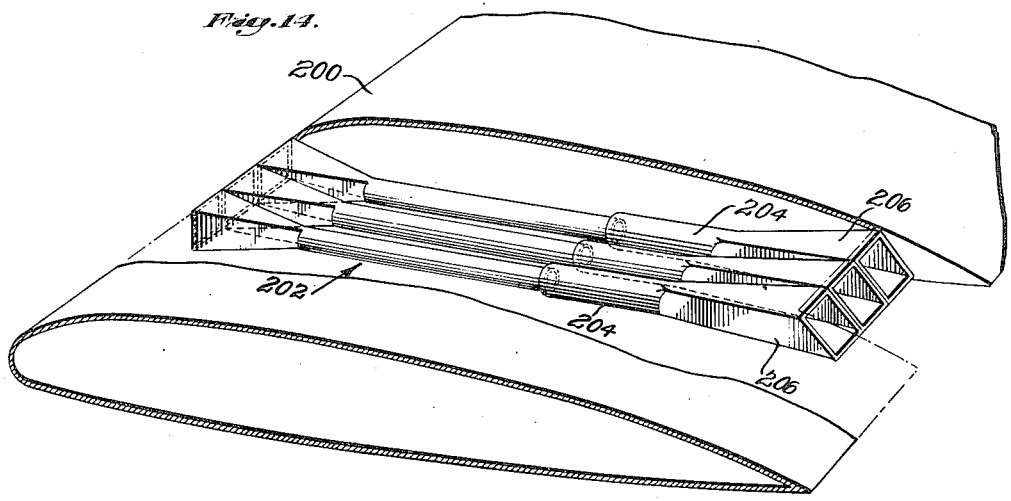

Figs. 13 to 15 illustrate various configurations to which a multi-unit burner of the type described is readily adaptable. Thus, Fig. 13 illustrates a configuration for a relatively flat installation as might be required in a wing of an aircraft. Herein the diffusers and mixing sections connected thereto can discharge into a common flat combustion chamber 140. Fig. 14 represents a configuration adopted for mounting within a wing 200 with each of the ramjet units 202 discharging into individual combustion chambers 204 and exhaust nozzles 206. Fig. 15 illustrates an arrangement for conducting the fuel-air mixture from separate ducts 210 into a round common combustion chamber 212.

Fig. 16 illustrates a ramjet unit having a single annular diffuser 144, a single mixing section 146 and a combustion chamber comprising a plurality of individual units 148. Fig. 17 illustrates a ramjet unit having a single diffuser 150 with a plurality of mixing sections 152 and a plurality of combustion chambers 154. Fig. 18 illustrates a multi-unit ramjet which comprises a group of individual units none of which have any common sections.

As a result of this invention it is readily apparent that a ramjet power plant of almost any desirable size and shape can be constructed from a number of individual units whereby the total power output can readily be varied by operating all, or just a limited number of, the individual units comprising a portion of the engine.

Although various embodiments of this invention have been illustrated and described herein, it will be apparent that various other changes and modifications may be made in the arrangement and construction of the various parts without departing from the scope of this novel concept.

What it is desired to obtain by Letters Patent is:

1. In a ramjet power plant, a diffuser section comprising a mixing section, a combustion section receiving fluid from said mixing section and being defined by a wall, at least one of said sections comprising a plurality of individual units, means for introducing fuel in said mixing section, means for mixing said fuel with the air passing through said passages comprising a plurality of vanes of airfoil shape extending from the walls of said mixing section and terminating in vortex producing tips, means for igniting said fuel comprising pilot flame mechanism in said combustion section, and shield means protruding from the burner section wall located upstream of and adjacent to said flame mechanism.

2. In a multi-unit ramjet, the combination of a diffuser section comprising a plurality of individual diffuser passages, means for introducing fuel into said diffuser passages including fuel nozzles in the wall of said passages, means for mixing said fuel with the air passing through said passages comprising a plurality of vanes of airfoil shape extending from the wall of said passages and terminating in vortex producing tips, a burner downstream of said diffuser section, means for improving ignition of the fuel-air mixture adjacent the upstream end of said burner comprising a wall lying in a plane transversely of the axis of flow including openings communicating with the downstream ends of said passages, the wall portions between said openings forming sudden expansion, low velocity, shielded flame holding areas, and a pilot flame mechanism in the shielded section adjacent the downstream face of said wall.

3. A multi-unit ramjet according to claim 1 wherein said pilot flame mechanism includes at least one jet emitting combustible products parallel to the axis of flow through said burner section.

4. In a ramjet power plant, a supersonic diffuser section, a subsonic diffusion and mixing section downstream of said supersonic diffuser section, a combustion section receiving fluid from said mixing section and being defined by a wall, at least one of said sections comprising a plurality of individual units with each unit forming a separate path for the fluid flowing therethrough, means for introducing fuel in said mixing section, means for igniting said fuel comprising pilot flame mechanism in said combustion section, including at least one jet emitting combustible products into said combustion section, shield means protruding from the burner wall located upstream of and adjacent to said flame mechanism, and means for igniting the pilot flame produced by said flame mechanism.

5. In a ramjet power plant, an air entrance, a diffuser comprising a mixing section downstream of said entrance, a combustion section receiving fluid from said mixing section, said entrance and said diffuser comprising a plurality of individual units cooperating to form a cluster of spaced ducts, means for introducing fuel at spaced points about the periphery of said ducts, means for mixing the fuel with the air passing through said ducts including a plurality of vanes of airfoil shape extending from the walls of said duct and having their chordwise dimensions at an angle relative to the axis of flow thereby producing vortices from the tips thereof, said vanes being spaced from said fuel introducing means along the axis of flow, a common wall transverse to the axis of flow having openings receiving the downstream ends of said ducts, said combustion section extending downstream from said wall as a single duct having a cross-sectional area greater than the total area of said openings and cooperating with said wall to create a sudden expansion for the fluids moving downstream from said ducts, and pilot flame mechanism adjacent the downstream face of said wall for initially creating ignition adjacent the downstream face of said wall in the areas between the openings therein.

6. In a ramjet power plant according to claim 5 wherein the downstream ends of said ducts are polygonal and the areas between said ends are of substantially uniform dimensions.

7. In a ramjet power plant, an air entrance, a supersonic diffuser section receiving air from said entrance, a subsonic diffuser section downstream of said supersonic diffuser, a combustion section receiving fluid from said subsonic diffuser, said entrance and said diffuser sections comprising a plurality of individual units cooperating to form a cluster of spaced ducts, means for introducing fuel at spaced points about the periphery of said ducts in said subsonic diffuser section, means for increasing the mixing of the fuel with the air passing through said ducts including a plurality of vanes of airfoil shape extending from the walls of said ducts and having their chordwise dimension at an angle relative to the axis of flow for producing trailing vortices from the tips thereof, said vanes being spaced from said fuel introducing means along the axis of flow, a wall transverse to the axis of flow having spaced openings receiving the downstream ends of said ducts, said openings being grouped in a circular cluster, said combustion section extending downstream from said wall as a single duct and cooperating with said wall to create a sudden expansion for the fluids moving downstream from said ducts, and pilot flame mechanism adjacent the downstream face of said wall for initially igniting the fuel-air mixture adjacent the downstream face of said wall in the area formed by the spacing between said openings.

8. In a ramjet according to claim 7 wherein said vanes comprise at least one peripherally spaced set in said ducts with each adjacent vane having its chordwise dimension oppositely inclined relative to the axis of flow.

9. In a ramjet according to claim 8 wherein said fuel introducing means comprise at least two sets of peripherally spaced nozzles in said ducts with one set located upstream and another set located downstream of said vanes, with at least one of said sets of peripherally spaced nozzles aligned with the spaces between said vanes relative to the axis of flow.

10. In a ramjet power plant, a diffuser section comprising a mixing section having a mass of air flowing therethrough, a combustion section receiving fluid from said mixing section and having a substantially constant cross-sectional area greater than said diffuser section, an exhaust nozzle exhausting fluid from said burner section, at least one of said sections comprising a plurality of clustered units, each of said units forming a separate path for the fluid flowing therethrough, means for introducing fuel in said mixing section to mix with the air therein, means for igniting the fuel-air mixture comprising pilot flame mechanism in said combustion section, shield means located upstream of and adjacent said flame mechanism including a wall portion connecting the adjacent ends of said diffuser and combustion sections and lying substantially transversely of the axis of fluid flow therethrough, and igniter means for said pilot flame mechanism.

11. In a ramjet power plant according to claim 10 including a source of fuel under pressure, a mass flow sensing device located in said mixing section, and a regulator receiving fuel from said source and responsive to said sensing device for regulating the flow of fuel from said source including fluid connections to said fuel introducing means.

12. In a multi-unit ramjet, the combination of a diffuser section having a plurality of individual diffuser passages, a common combustion chamber receiving fluid from said passages including a wall at the junction of said diffuser section and said combustion chamber and lying in a plane transversely of the axis of fluid flow, said wall closing the areas between said passages and forming protected areas adjacent the upstream end of said combustion chamber, means for injecting fuel into said passages, and means adjacent the downstream face of said wall and in said protected areas for igniting said fuel air mixture.

13. In a ramjet power plant, the combination of a diffuser having a stream of air passing therethrough, means for introducing fuel into said diffuser to mix with said air, a combustion chamber receiving fluid from said diffuser and having an area greater than the exit area of said diffuser, a wall lying in a plane transversely of the axis of fluid flow and spanning the space between the adjacent ends of said diffuser and combustion section forming a sudden expansion region for the fluid flowing into the combustion chamber, and pilot flame mechanism adjacent the downstream face of said wall.

14. In a multi-unit ramjet, the combination of a diffuser section comprising a plurality of individual diffuser passages, means for introducing fuel into said diffuser passages including fuel nozzles in the wall of said passages, a burner downstream of said diffuser section, means for improving ignition of the fuel-air mixture adjacent the upstream end of said burner comprising a wall lying in a plane transversely of the axis of flow including openings communicating with the downstream ends of said passages, the wall portions between said openings forming shielded flameholding areas, and ignition mechanism in the shielded areas and adjacent the downstream face of said wall.

15. In a ramjet power plant according to claim 14 including means for regulating the flow of fuel to one or more of said diffuser passages.

References Cited in the file of this patent

UNITED STATES PATENTS

| | | |
|---|---|---|
| 1,863,391 | Bluemel | June 14, 1932 |
| 1,980,266 | Goddard | Nov. 13, 1934 |
| 2,500,712 | Serrell | Mar. 14, 1950 |
| 2,508,420 | Redding | May 23, 1950 |
| 2,581,902 | Bodine | Jan. 8, 1952 |
| 2,632,994 | Sargent | Mar. 31, 1953 |
| 2,637,972 | Laucher | May 12, 1953 |
| 2,696,076 | Weeks | Dec. 7, 1954 |